(12) United States Patent
Kim et al.

(10) Patent No.: US 10,770,701 B2
(45) Date of Patent: Sep. 8, 2020

(54) BATTERY PACK STRUCTURE WITH SUPPORT PLATES

(71) Applicants: Hyundai Motor Company, Seoul (KR); Kia Motors Corporation, Seoul (KR)

(72) Inventors: Min Wook Kim, Yongin-si (KR); Beom Joo Kwon, Suwon-si (KR); Yoon Cheol Jeon, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 38 days.

(21) Appl. No.: 16/017,656

(22) Filed: Jun. 25, 2018

(65) Prior Publication Data

US 2019/0173066 A1    Jun. 6, 2019

(30) Foreign Application Priority Data

Dec. 6, 2017   (KR) .......................... 10-2017-0166712

(51) Int. Cl.
| | |
|---|---|
| *H01M 2/10* | (2006.01) |
| *H01M 2/30* | (2006.01) |
| *H01M 2/20* | (2006.01) |
| *B60L 50/60* | (2019.01) |

(52) U.S. Cl.
CPC ........... *H01M 2/1077* (2013.01); *B60L 50/66* (2019.02); *H01M 2/206* (2013.01); *H01M 2/305* (2013.01); *H01M 2220/20* (2013.01)

(58) Field of Classification Search
CPC . B60L 50/66; H01M 2220/20; H01M 2/1077; H01M 2/206
See application file for complete search history.

(56) References Cited

U.S. PATENT DOCUMENTS

| | | | |
|---|---|---|---|
| 2008/0280194 A1* | 11/2008 | Okada ................. | H01M 10/052 429/99 |
| 2010/0000816 A1* | 1/2010 | Okada ................. | H01M 2/1077 180/68.5 |
| 2010/0187027 A1* | 7/2010 | Komaki .............. | H01M 2/1077 180/65.21 |
| 2011/0076521 A1* | 3/2011 | Shimizu .................. | H01M 2/26 429/7 |
| 2012/0040226 A1* | 2/2012 | Kim ..................... | H01M 2/1077 429/120 |
| 2012/0052359 A1* | 3/2012 | Yoshitake ......... | H01M 10/6562 429/120 |
| 2013/0130078 A1* | 5/2013 | Schaefer ........... | H01M 10/6557 429/72 |
| 2013/0183571 A1* | 7/2013 | Miyazaki .......... | H01M 10/6557 429/156 |

(Continued)

FOREIGN PATENT DOCUMENTS

KR    10-2015-0031877 A    3/2015

*Primary Examiner* — Imran Akram
(74) *Attorney, Agent, or Firm* — Morgan, Lewis & Bockius LLP

(57) ABSTRACT

A battery pack structure of a vehicle, may include a cell module assembly formed by stacking a plurality of cell modules, end plates coupled to both side end portions of the cell module assembly, and support plates coupled to the top and the bottom of the cell module assembly and both side end portions of the end plates to bring the cell modules in contact with each other.

5 Claims, 7 Drawing Sheets

(56) References Cited

U.S. PATENT DOCUMENTS

| | | | | |
|---|---|---|---|---|
| 2014/0295227 A1* | 10/2014 | Aoki | H01M 2/1016 | 429/82 |
| 2015/0024253 A1* | 1/2015 | Noh | H01M 2/1077 | 429/156 |
| 2015/0140406 A1* | 5/2015 | Kim | H01M 2/1077 | 429/156 |
| 2016/0043365 A1* | 2/2016 | Vogel | H01M 2/1077 | 429/99 |
| 2016/0149180 A1* | 5/2016 | Tokoo | H01M 10/0585 | 429/120 |
| 2016/0218333 A1* | 7/2016 | Takasaki | H01M 2/1077 | |
| 2016/0365554 A1* | 12/2016 | Iqbal | H01M 10/647 | |
| 2017/0237050 A1* | 8/2017 | Joerg | H01M 10/613 | 429/99 |
| 2017/0309877 A1* | 10/2017 | Wu | H01M 10/0481 | |
| 2019/0189982 A1* | 6/2019 | Lee | H01M 10/0472 | |

* cited by examiner

BATTERY PACK STRUCTURE WITH SUPPORT PLATES

CROSS-REFERENCE TO RELATED APPLICATION

The present application claims priority to Korean Patent Application No. 10-2017-0166712, filed on Dec. 6, 2017 in the Korean Intellectual Property Office, the entire contents of which is incorporated herein for all purposes by this reference.

BACKGROUND OF THE INVENTION

Field of the Invention

The present invention relates to a battery pack structure of a vehicle and, more particularly, to a battery pack structure of a vehicle, the battery pack structure having reduced weight and size due to improvement of the structure of the battery pack and being characterized by uniform distribution of surface pressure on cells by reducing differences among the cells due to increases in capacity and in the number of cells of a battery system.

Description of Related Art

High capacity and high power are required for high-voltage battery systems that are mounted on eco-friendly vehicles to satisfy needs of customers such as long mileage and high zero-to-hundred performance on a single charge, and short charging time. To this end, it is necessary to increase the energy density in high-capacity battery systems.

There is a method of increasing the loading capacity of cells to increase the energy density of a battery system, but it may be accompanied by package limit on a vehicle, an increase in weight and manufacturing cost, and a decrease in energy efficiency.

The structures of pack modules in the related art are simply increased only in size in the cell stacking direction, so excessive temperature differences occur among cells due to coming-off inside the pack modules, and the durability of specific cells deteriorates, which causes deterioration of the durability of the entire system. Furthermore, the durability of specific calls deteriorates by pressure that excessively presses cells around the end plate, so the durability of the entire system is deteriorate.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a structure which is optimized not in terms of increasing the loading capacity of battery cells, but in terms of the pack module of a battery system in order to solve the problems of the related art and increase the energy density of a battery system according to the current technical tendency to increase the mileage of an electric vehicle and the capacity of a battery.

Various aspects of the present invention are directed to providing a battery pack structure of a vehicle and, more particularly, to a battery pack structure of a vehicle, the battery pack structure having reduced weight and size due to improvement of the structure of the battery pack and being characterized by uniform distribution of surface pressure on cells by reducing differences among the cells that are increased due to increases in capacity and in the number of cells of a battery system.

In accordance with an aspect of the present invention, there is provided a battery pack structure of a vehicle, the battery pack structure including: a cell module assembly formed by stacking a plurality of cell modules; end plates coupled to both side ends of the cell module assembly; and support plates coupled to the top portion and the bottom portion of the cell module assembly and both side ends of the end plates to bring the cell modules in close contact with each other.

The cell modules each have a terminal on a side for electrical connection between the cell modules and a fastening portion on the other side for coupling to the support plates, and the cell modules are stacked such that the terminals and the fastening portions are alternately disposed in the cell module assembly.

The battery pack structure may further include bus bars electrically connecting the terminals of the cell modules facing each other.

A support plate coupled to the top portion of the cell module assembly and both side ends of the end plates has a plurality of protrusions formed toward the fastening portions of the cell modules, and the fastening portions of the cell modules are thread-fastened to the protrusions.

The support plates each have locking structure at both side end portions, so that the support plates are locked to the end plates such that the end plates press the cell module assembly.

In accordance with another aspect of the present invention, there is provided a battery pack structure of a vehicle, the battery pack assembly including: a cell module assembly formed by stacking a plurality of cell modules; first and second end plates coupled to both side end portions of the cell module assembly; a first support plate being in close contact with the top portion of the cell module assembly on a surface, having locking structures at both side end portions, and locked to the first and second end plates such that the first and second end plates press the cell module assembly; and a second support plate being in close contact with the bottom portion of the cell module assembly on a surface and having locking structures at both side end portions to be locked to the first and second end plates such that the first and second end plates press the cell module assembly.

The cell modules each have a terminal on a side for electrical connection between the cell modules and a fastening portion on the other side for coupling to the support plates, and the cell modules are stacked such that the terminals and the fastening portions are alternately disposed in the cell module assembly.

The battery pack structure may further include bus bars electrically connecting the terminals of the cell modules facing each other.

According to the battery pack structures of a vehicle of various embodiments, it is possible to reduce weight and size by improving the structure of battery packs and to more uniformly distribute surface pressure on cells by reducing differences among the cells due to increases in capacity and in the number of cells of a battery system.

Furthermore, as the weight of the battery pack is reduced, the mileage of an electric vehicle by a single charge charging may be increased.

Furthermore, as the size of the battery pack is reduced, it is possible to secure a space for increasing a cell size, improve the aerodynamic characteristics of a vehicle, and increase the internal space of a vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
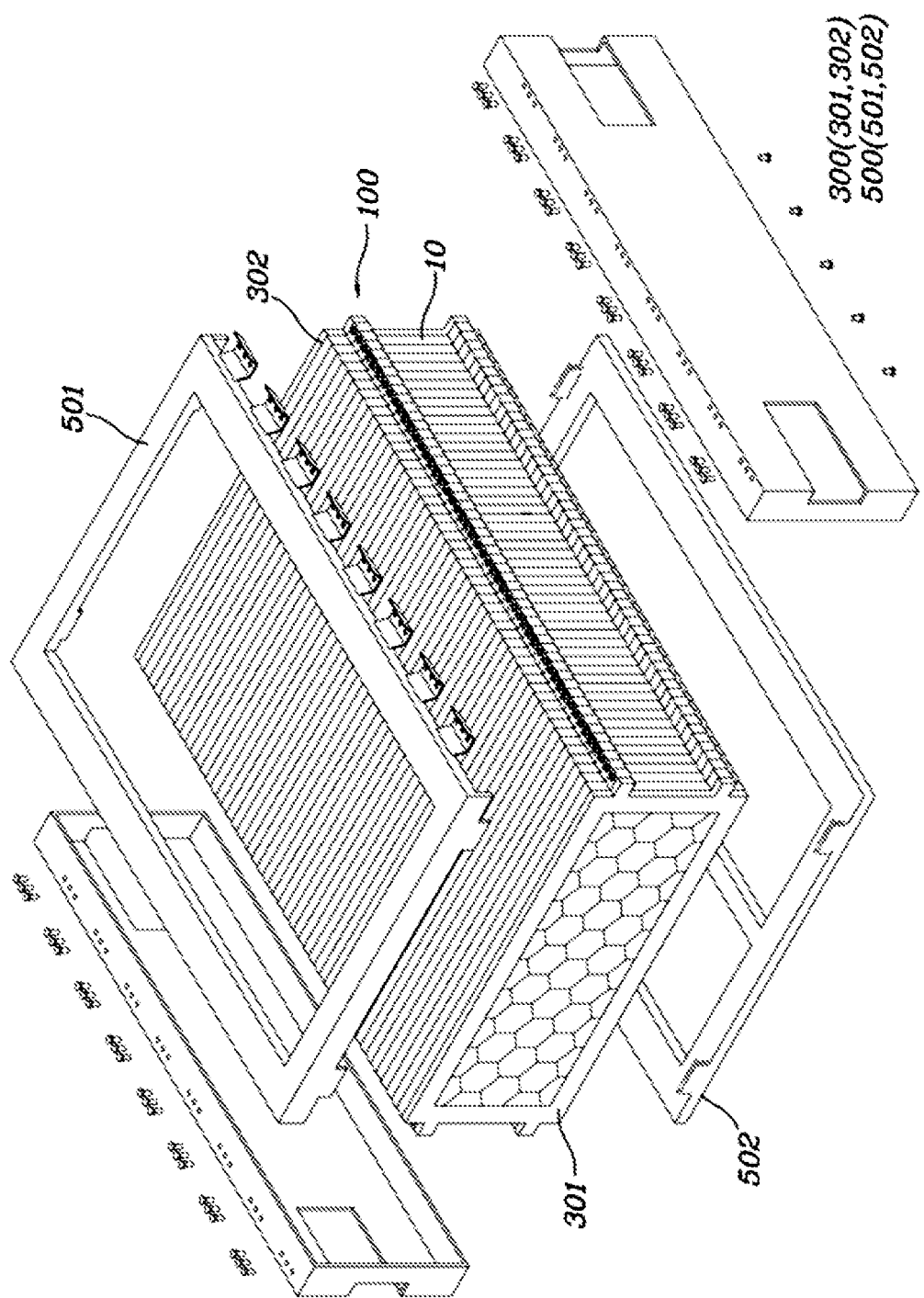
FIG. 1 is a view illustrating a battery pack structure of a vehicle according to an exemplary embodiment.

It may be understood that the appended drawings are not necessarily to scale, presenting a somewhat simplified representation of various features illustrative of the basic principles of invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Hereinafter, a battery pack structure of a vehicle according to various embodiments is described with reference to the accompanying drawings.

Figure 2:
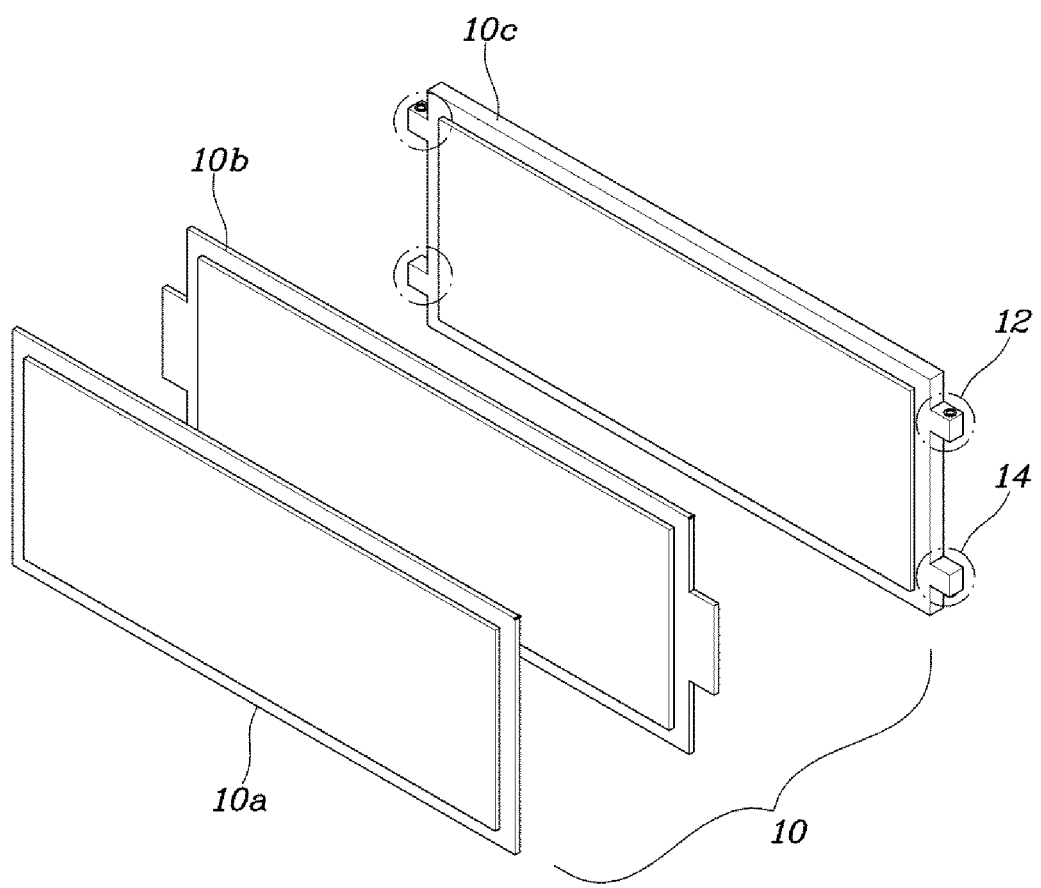
FIG. 2 is a view illustrating a cell module of the battery pack structure of a vehicle according to an exemplary embodiment.
Figure 3:
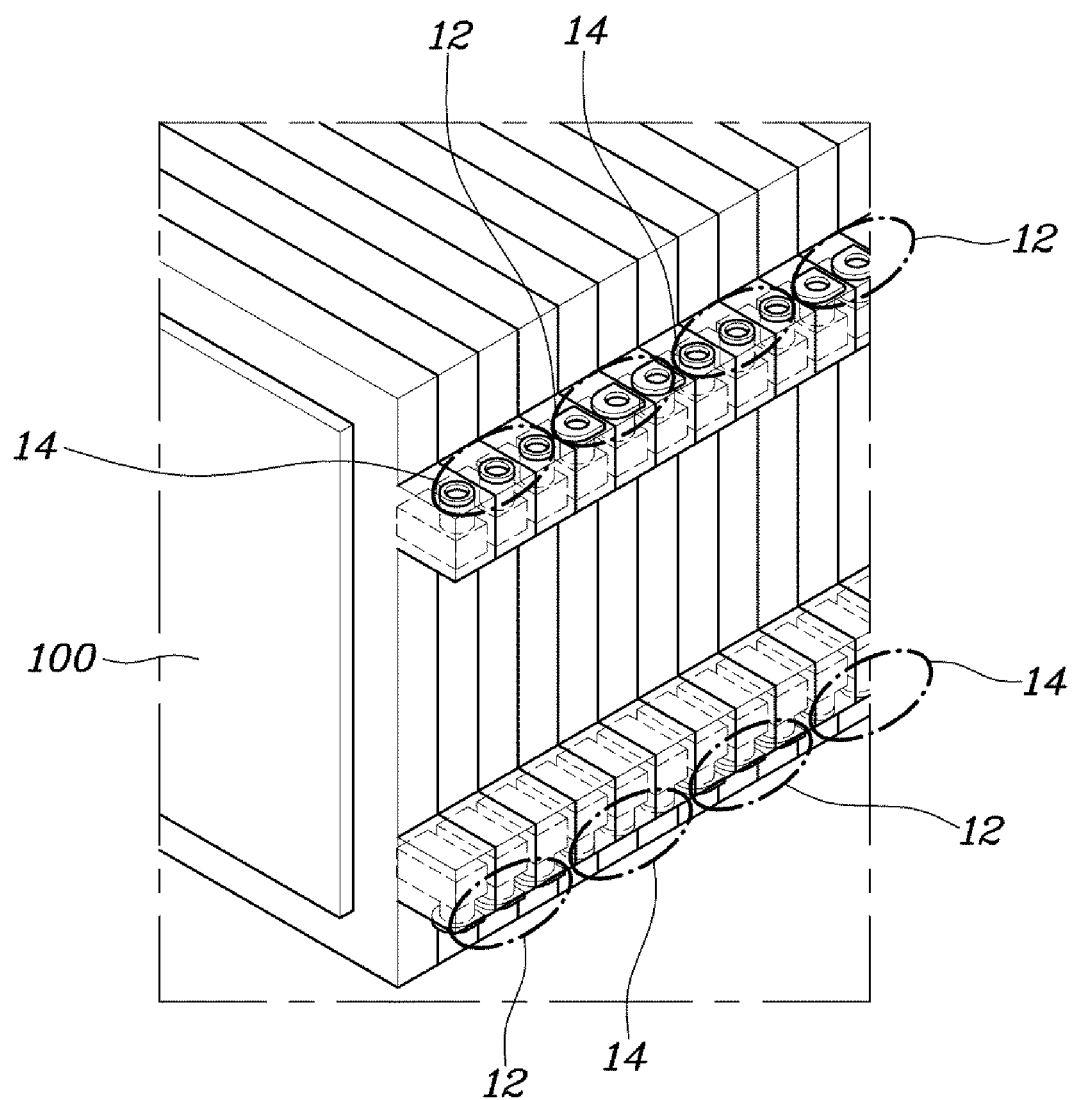
FIG. 3 is a view illustrating cell module terminals of the battery pack structure of a vehicle according to an exemplary embodiment.
Figure 4:
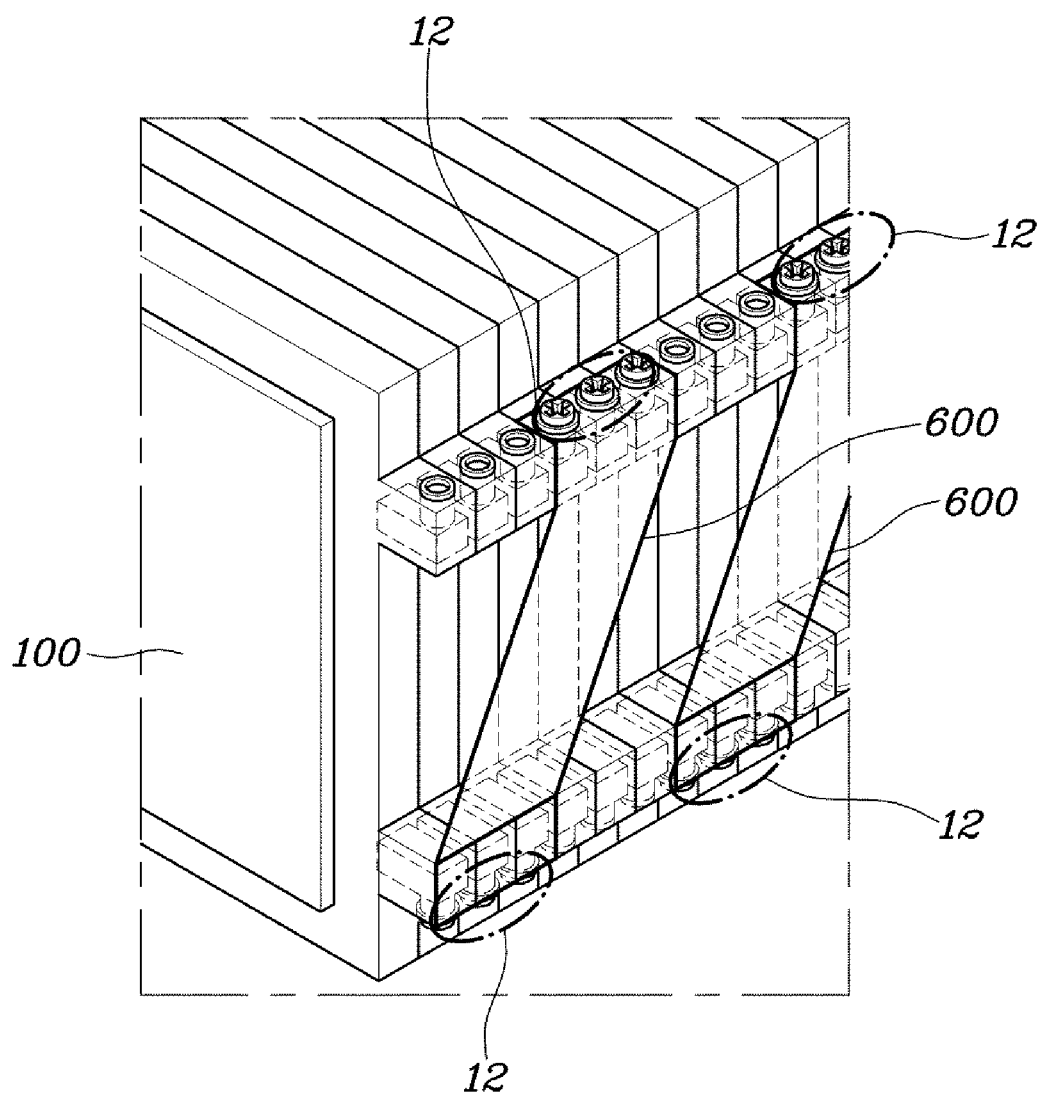
FIG. 4 is a view illustrating bus bars of the battery pack structure of a vehicle according to an exemplary embodiment.
Figure 5:
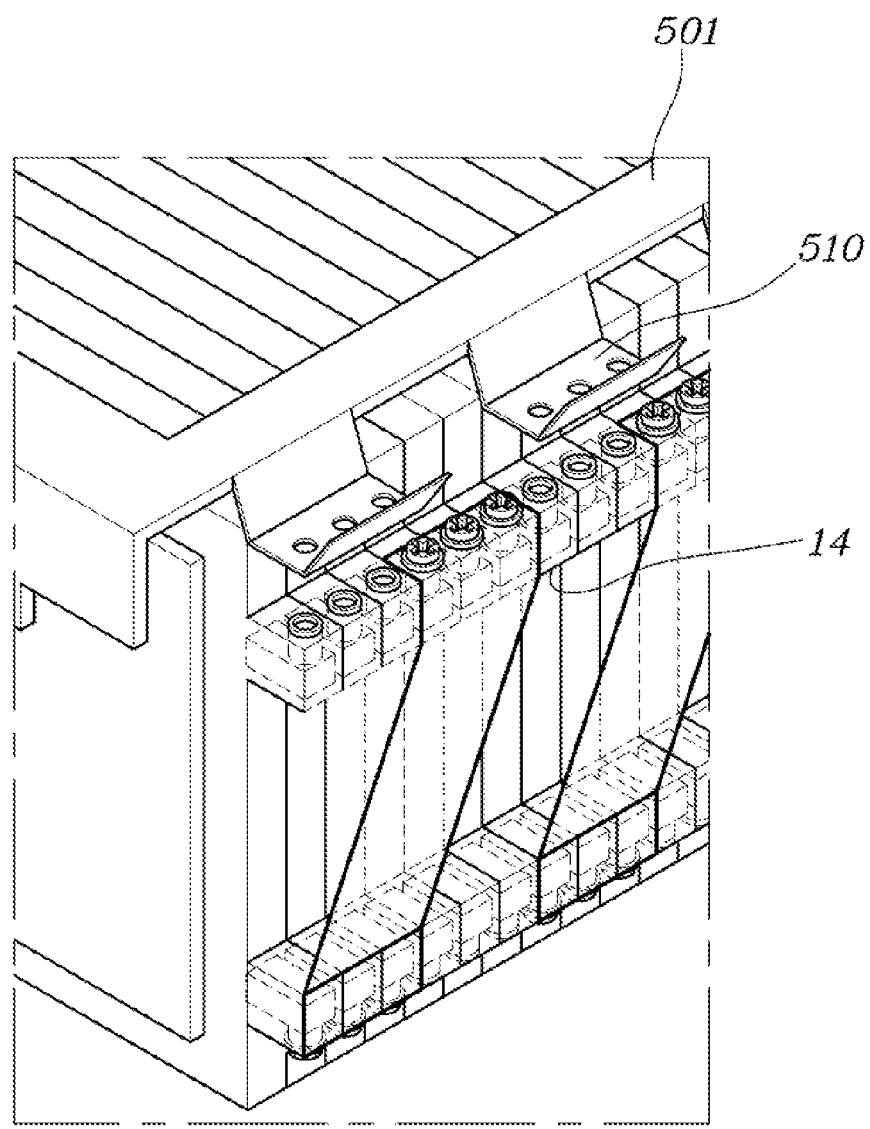
FIG. 5 and FIG. 6 are views illustrating coupling between the cell module terminals and a support plate of the battery pack structure of a vehicle according to an exemplary embodiment.
Figure 6:
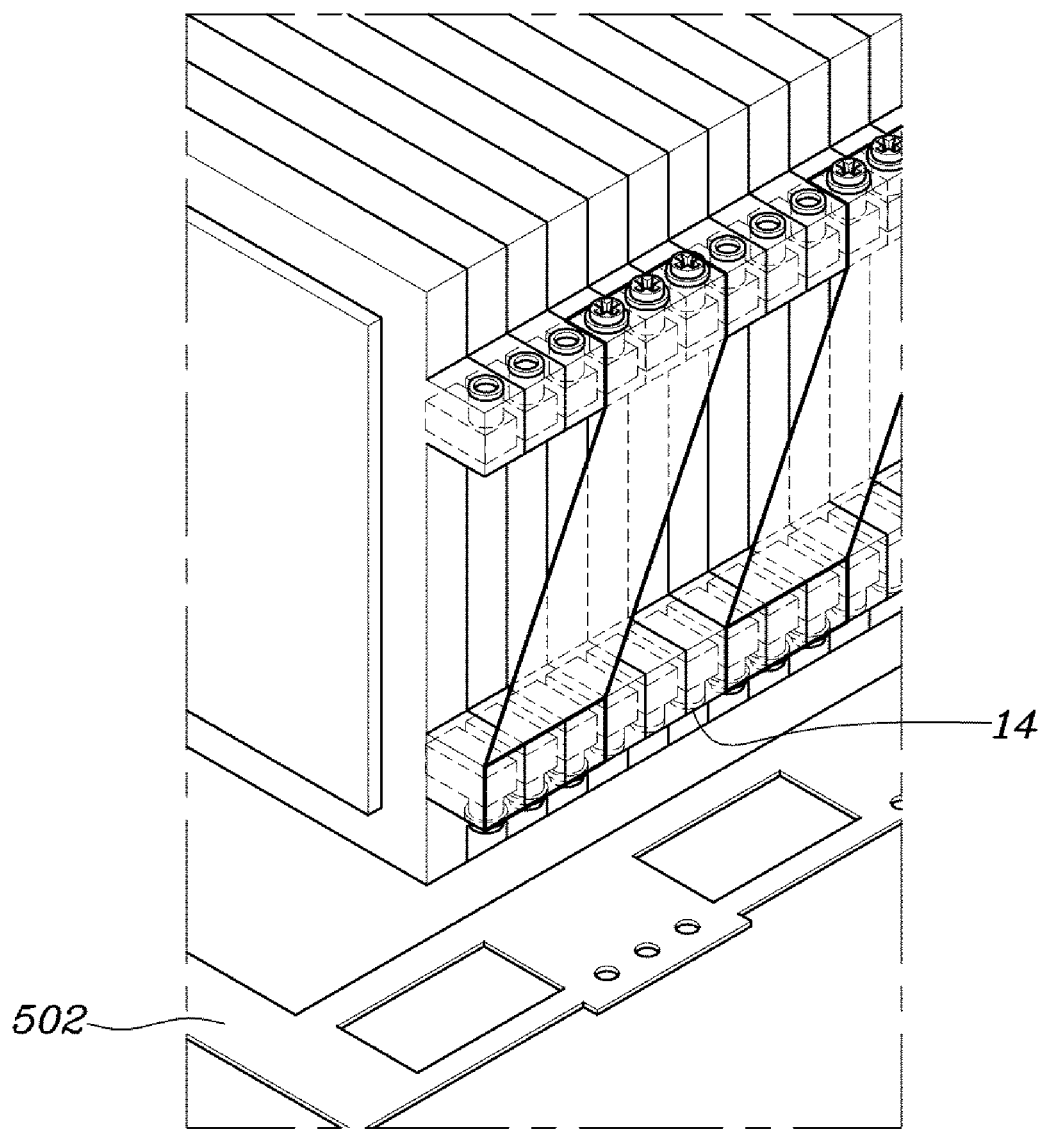
Figure 7:
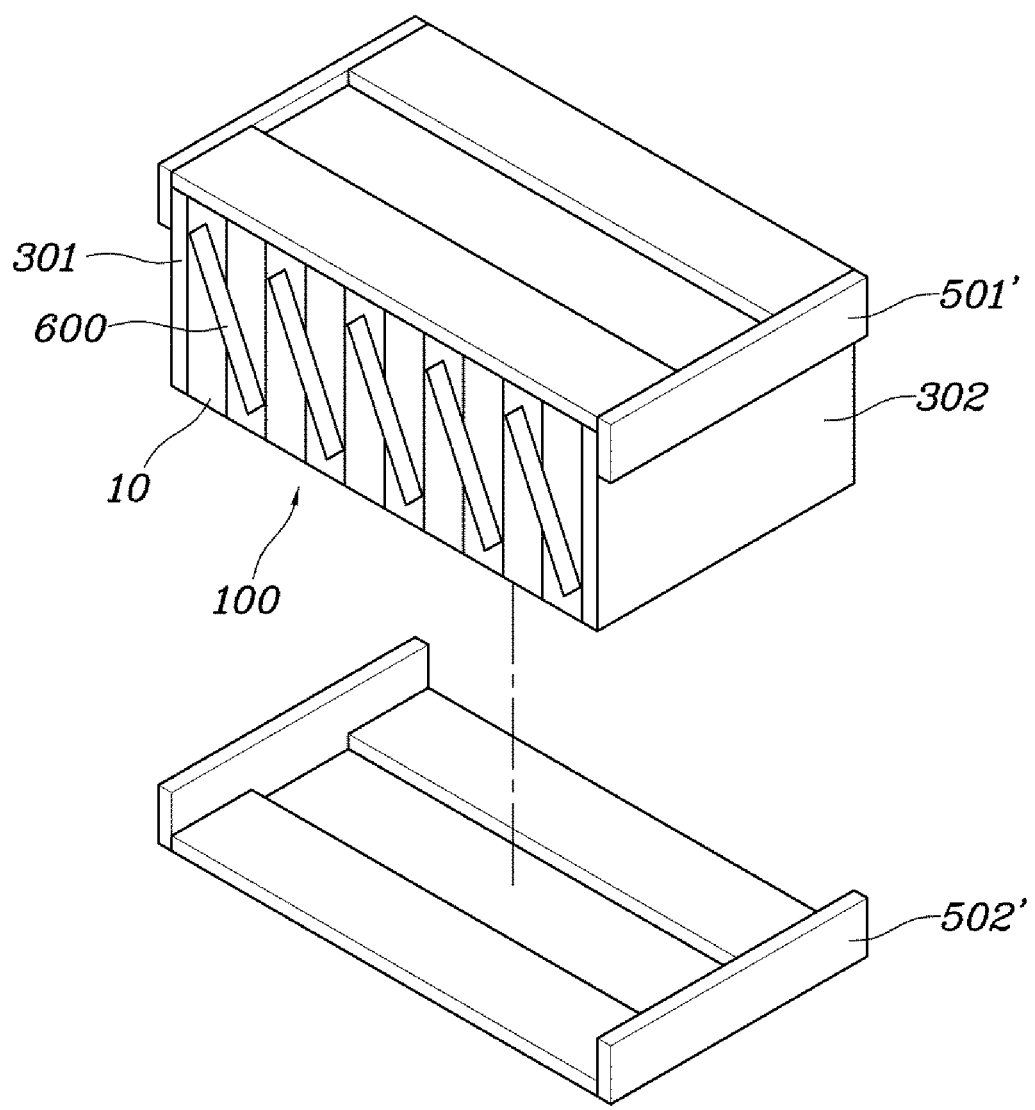
FIG. 7 is a view illustrating a battery pack structure of a vehicle according to an exemplary embodiment of the present invention.

FIG. 1 is a view illustrating a battery pack structure of a vehicle according to various exemplary embodiments of the present invention, FIG. 2 is a view illustrating a cell module of the battery pack structure of a vehicle according to an exemplary embodiment of the present invention, and FIG. 3 is a view illustrating cell module terminals of the battery pack structure of a vehicle according to an exemplary embodiment of the present invention. FIG. 4 is a view illustrating bus bars of the battery pack structure of a vehicle according to an exemplary embodiment of the present invention, FIG. 5 and FIG. 6 are views illustrating coupling between the cell module terminals and a support plate of the battery pack structure of a vehicle according to an exemplary embodiment of the present invention, and FIG. 7 is a view illustrating a battery pack structure of a vehicle according to an exemplary embodiment of the present invention.

First, referring to FIG. 1, a battery pack structure of a vehicle according to an exemplary embodiment of the present invention may include: a cell module assembly 100 formed by stacking a plurality of cell modules 10; end plates 300 coupled to both side end portions of the cell module assembly 100; and support plates 500 coupled to the top portion and bottom portion of the cell module assembly 100 and both side end portions of the end plates 300 to bring the cell modules 10 in close contact with each other.

The cell module assembly 100 is formed by stacking the cell modules 10, and referring to FIG. 2, the cell modules 10 each may include a cooling channel 10a, a cell 10b, and a cartridge 10c. The cell modules 10 each have a terminal 12 on a side for electrical connection between the cell modules and a fastening portion 14 on the other side for coupling to the support plates 500.

Referring to FIG. 3, the cell modules 10 are stacked such that the terminals 12 and the fastening portions 14 are alternately disposed in the cell module assembly 100. Referring to FIG. 4, a bus bar 600 is connected between the terminals 12 of cell modules 10 facing each other, forming electrical connection between the cell modules 10. The bus bars 600 connecting cell modules 10 facing each other function as a structure that fixes the cell module assembly 100.

The end plates 300 are coupled to both side end portions of the cell module assembly 100 such that the cell modules 10 are in close contact with each other by the support plates 500 to be described below.

The support plates 500 are coupled to the top portion and bottom portion of the cell module assembly 100 and both side end portions of the end plates 300, bringing the cell modules 10 in close contact with each other.

In detail, referring to FIGS. 1 and 5, the support plate 501 coupled to the top portion of the cell module assembly 100 and both side end portions of the end plates 300 has a plurality of protrusions 510 protruding toward the fastening portions 14 of the cell modules 10. The protrusions 510 of the support plates 501 are thread-fastened to the fastening portions 14 of the cell modules.

Referring to FIG. 6, in an exemplary embodiment of the present invention, the support plate 502 coupled to the bottom portion of the cell module assembly 100 and both side end portions of the end plates 300 has a plurality of grooves so it is thread-fastened to the fastening portions 14 of the cell modules 10.

Referring to FIG. 1, the support plates 500 have locking structures at both side end portions that are coupled to the end plates 300, so they are locked to the edge portions of the end plates 300.

As described above, since the support plates 500 are coupled to the top portion and bottom portion of the cell module assembly 100 and both side end portions of the end plates 300 and fastened to both of the cell module assembly 100 and the end plates 300, it is possible to reduce weight and size and to more uniformly distribute surface pressure on cells by reducing differences among the cells that are increased due to increases in capacity and in the number of cells of a battery system. Furthermore, as the weight of the battery pack is reduced, the mileage of an electric vehicle by a single charge may be increased. Furthermore, as the size of the battery pack is reduced, it is possible to secure a space for increasing a cell size, improve aerodynamic characteristics of a vehicle, and increase the internal space of a vehicle.

Referring to FIG. 7, a battery pack structure of a vehicle according to various exemplary embodiments may include: a cell module assembly 100 formed by stacking a plurality of cell modules 10; first and second end plates 301 and 302 coupled to both side end portions of the cell module assembly 100; a first support plate 501' being in close contact with the top portion of the cell module assembly 100 on a surface, having locking structures a both side end portions, and locked to the first and second end plates 301 and 302 such that the first and second end plates 301 and 302 press the cell module assembly 100; and a second support plate 502' being in close contact with the bottom portion of the cell module assembly 100 on a surface and having locking structures at both side end portions to be locked to the first and second end plates 301 and 302 such that the first and second end plates 301 and 302 press the cell module assembly 100.

The cell module assembly 100 is formed by stacking the cell modules 10. The cell modules 10 are the same as the cell modules 10 of the various exemplary embodiments and each have a terminal on a side for electrical connection between the cell modules and a fastening portion at the other side for coupling to the support plates 501' and 502', and the cell modules 10 are stacked such that the terminals and the fastening portions are alternately disposed in the cell module assembly 100.

A bus bar 600 is the same as the bus bar 600 in the various exemplary embodiments and electrically connects the terminals of cell modules 10 facing each other.

The first and second end plates 301 and 302 are the same as the end plates 300 of the various exemplary embodiments and are coupled to both side end portions of the cell module assembly 100.

The first support plate 501' is in contact with the top portion of the cell module assembly 100 on a surface and has locking structure at both side end portions, so it is locked to the first and second end plates 301 and 302 such that the first and second end plates 301 and 302 press the cell module assembly 100.

The second support plate 502' is in contact with the bottom portion of the cell module assembly 100 on a surface and has locking structure at both side end portions, so it is locked to the first and second end plates 301 and 302 such that the first and second end plates 301 and 302 press the cell module assembly 100.

As described above, since not only the first and second support plates 501' and 502', but the first and second end plates 301 and 302 are collectively fastened to the cell module assembly 100, it is possible to reduce weight and size and to more uniformly distribute surface pressure on cells by reducing differences among the cells that are increased due to increases in capacity and in the number of cells of a battery system. Furthermore, as the weight of the battery pack is reduced, the mileage of an electric vehicle by one-time charging may be increased. Furthermore, as the size of the battery pack is reduced, it is possible to secure a space for increasing a cell size, improve the aerodynamic characteristics of a vehicle, and increase the internal space of a vehicle.

As described above, according to the battery pack structures of a vehicle of various embodiments, it is possible to reduce weight and size by improving the structure of battery packs and to more uniformly distribute surface pressure on cells by reducing differences among the cells that are increased due to increases in capacity and in the number of cells of a battery system.

Furthermore, as the weight of the battery pack is reduced, the mileage of an electric vehicle by one-time charging may be increased.

Furthermore, as the size of the battery pack is reduced, it is possible to secure a space for increasing a cell size, improve the aerodynamic characteristics of a vehicle, and increase the internal space of a vehicle.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A battery pack structure of a vehicle, the structure comprising:
   a cell module assembly formed by stacking a plurality of cell modules;
   end plates coupled to first and second side end portions of the cell module assembly; and
   first and second support plates coupled to a top portion and a bottom portion of the cell module assembly and first and second side end portions of the end plates to bring the cell modules in contact with each other,
   wherein the cell modules each have a terminal on a first side for electrical connection between the cell modules and a fastening portion on a second side for coupling to the first and second support plates,
   wherein the cell modules are stacked such that the terminals and the fastening portions of the cell modules are alternately disposed in the cell module assembly in groupings of at least two terminals and fastening portions,
   wherein the first support plate that is coupled to the top portion of the cell module assembly and the first and second side end portions of the end plates, has a plurality of protrusions formed toward the fastening portions of the cell modules, and
   wherein the fastening portions of the cell modules are fastened to the protrusions.

2. The battery pack structure of claim 1, further including bus bars electrically connecting the terminals of the cell modules facing each other.

3. The battery pack structure of claim 1, wherein the first and second support plates each have locking structure at first and second side end portions, so that the support plates are locked to the end plates such that the end plates press the cell module assembly.

4. A battery pack structure of a vehicle, the structure comprising:
- a cell module assembly formed by stacking a plurality of cell modules; first and second end plates coupled to first and second side end portions of the cell module assembly;
- a first support plate being in contact with a top portion of the cell module assembly on a surface, having locking structures at first and second side end portions thereof, and locked to the first and second end plates such that the first and second end plates press the cell module assembly; and
- a second support plate being in contact with a bottom portion of the cell module assembly on a surface and having locking structures to be locked to the first and second end plates such that the first and second end plates press the cell module assembly, wherein the cell modules each have a terminal on a first side for electrical connection between the cell modules and a fastening portion on a second side for coupling to the first and second support plates, wherein the cell modules are disposed such that the terminals and the fastening portions of the cell modules are alternately disposed in the cell module assembly in groupings of at least two terminals and fastening portions, wherein the first support plate that is coupled to the top portion of the cell module assembly and the first and second side end portions of the end plates has a plurality of protrusions formed toward the fastening portions of the cell modules, and wherein the fastening portions of the cell modules are fastened to the protrusions.

5. The battery pack structure of claim 4, further including bus bars electrically connecting the terminals of the cell modules facing each other.

* * * * *